(12) United States Patent
Bartlett

(10) Patent No.: US 11,492,084 B2
(45) Date of Patent: Nov. 8, 2022

(54) VESSEL STABILITY CONTROL SYSTEM USING MACHINE LEARNING TO OPTIMIZE RESOURCE USAGE

(71) Applicant: Michael Hughes Bartlett, Davie, FL (US)

(72) Inventor: Michael Hughes Bartlett, Davie, FL (US)

( * ) Notice: Subject to any disclaimer, the term of this patent is extended or adjusted under 35 U.S.C. 154(b) by 0 days.

(21) Appl. No.: 17/368,529

(22) Filed: Jul. 6, 2021

(65) Prior Publication Data

US 2021/0339834 A1 Nov. 4, 2021

Related U.S. Application Data

(63) Continuation-in-part of application No. 16/665,965, filed on Oct. 28, 2019.

(51) Int. Cl.
*B63B 79/40* (2020.01)
*B63B 79/10* (2020.01)
*B63B 39/02* (2006.01)
*B63B 39/06* (2006.01)
*B63B 39/04* (2006.01)

(52) U.S. Cl.
CPC .............. *B63B 79/40* (2020.01); *B63B 39/02* (2013.01); *B63B 39/04* (2013.01); *B63B 39/06* (2013.01); *B63B 79/10* (2020.01)

(58) Field of Classification Search
None
See application file for complete search history.

(56) References Cited

U.S. PATENT DOCUMENTS

| | | | | |
|---|---|---|---|---|
| 5,488,919 | A * | 2/1996 | Ferreiro | B63B 39/06 114/122 |
| 5,704,309 | A * | 1/1998 | Kohnen | B63G 8/16 114/123 |
| 2014/0033963 | A1* | 2/2014 | Szydlowski | B63B 35/285 114/74 R |
| 2019/0210591 | A1* | 7/2019 | Low | B60W 50/0098 |
| 2020/0140044 | A1* | 5/2020 | Seville, II | B63B 39/06 |
| 2020/0349835 | A1* | 11/2020 | Trim | G08G 1/093 |

* cited by examiner

*Primary Examiner* — Faris S Almatrahi
*Assistant Examiner* — Hongye Liang
(74) *Attorney, Agent, or Firm* — The Concept Law Group, PA; Scott D. Smiley; Scott M. Garrett

(57) ABSTRACT

A stability controller includes a machine learning engine that outputs stabilizer settings to several on-board stabilizer systems of a vessel based on various inputs. The machine learning engine is first trained based on human selections of stabilizer system settings, and then, once suitably trained, the stability controller can be used to optimize the use and operation of the stabilizer systems as conditions change, based on a quantity or stability quality that the vessel operator desires to optimize.

12 Claims, 9 Drawing Sheets

VESSEL STABILITY CONTROL SYSTEM USING MACHINE LEARNING TO OPTIMIZE RESOURCE USAGE

CROSS REFERENCE

This application is a continuation in part of U.S. patent application Ser. No. 16/665,965, filed 28 Oct. 2019, the entirety of which is hereby incorporated by reference.

FIELD OF THE INVENTION

The present invention relates generally to vessel stabilization, and, more particularly, relates to a control system that takes into account the available stabilization effectors, prior knowledge of how the vessel responds to those effectors, sea and wind conditions, and operational preferences to learn appropriate effector control parameters and select appropriate effector control settings for the stability effectors based on sea and weather conditions and the goal of the vessel operator.

BACKGROUND OF THE INVENTION

The concept of vessel stabilization goes back many years and has been in use for almost as long. Of the three dimensions of vessel movement, roll, pitch, and yaw, roll is the primary movement that is countered with stabilization, particularly in monohull vessels. Pitch stability is also of concern as it is also an important aspect of both crew comfort and hull integrity, and affects both mono and multi-hull vessels. Today, the most common vessel stabilization systems are gyroscopic stabilizers, fin stabilizers, and moving ballast systems. Gyroscopic stabilizers use a rotating mass in a gimbaled mount with the axis of rotation oriented perpendicularly to the roll axis. The roll of the vessel results in a counter torque response from the gyroscope which opposes and cancels out some or most of the roll that would occur without the gyroscope. Although gyroscopic stabilizers can operate according to different settings, the counter torque produced by these systems is a simple function of physics and conservation of momentum. The energy put into the gyroscope can be adjusted in response to sea conditions to conserve energy when little to no stability response is needed (e.g. in flat seas), and it can be increased accordingly as sea conditions increase the propensity to induce vessel roll.

Fin systems employ fins that extend from the hull of the vessel, below the waterline and which use hydrodynamic lift to counter the roll torque. The angle of the fins can be changed to create a lifting force on one side the vessel and a diving force on the other side of the vessel. However fin stabilizers, as they rely on hydrodynamic force created by water moving over the fin surface, lose their effectiveness at low speeds and are not as effective when the vessel is not moving with respect to the water, although they can offer some resistance to roll and pitch simply due to the moment arm they present in opposition to changes in the vessel position. More recently, there have been fin systems developed that act more like paddles for actively stabilizing a vessel that is not moving relative to the water. These are sometimes referred to as "at anchor" fin systems. In fact some fin systems differentiate by having settings for "under way" and "at anchor," and the fins are controlled differently depending on the setting selection. Fin systems use a control loop to control movement and positioning of the fins. The control loop, generally speaking, uses the output of inertial sensors, which indicate pitch and roll acceleration, in order to adjust the position and movement of the fins to create counter torque in opposition to pitch and roll that is induced by waves. These systems likewise can operate the control loop function based on settings or other input by the vessel crew to adjust between resource usage and crew comfort and other considerations such as vessel load.

Some hybrid systems have been proposed in which a central controller operates the control loop of two or more different stabilization systems in response to inertial parameters. These systems have to be carefully tuned to the particular stabilizer system components, as well as the particular vessel's natural response to sea conditions, and control parameters for the feedback are based on those aspects of the vessel. In operation, the controller in a hybrid stabilizer system uses inertial sensor output to provide control signals to each of the different stabilizer systems to adjust the stability components in response to sensed changes in vessel motion. However, hybrid stabilizer systems require an integrated design approach so that the stability dynamics of the systems can be controlled synergistically as part of the same control loop. A vessel that has separate, non-integrated stabilizer systems, with each system operating on its own control loop, must still be manually adjusted by settings that are selected by the crew. The crew must then attempt to learn the vessel response, the response capability of each stabilizer system, and learn over time what settings to apply to each stabilizer system based on the goal or preferences of the vessel crew.

FIG. 7 shows a block schematic diagram of a vessel stabilizer system 700, in accordance with the prior art. The system 700 includes a stabilizer loop controller 704 that controls a stabilizer effector or effectors 706. The stabilizer loop controller 704 is responsive to an input signal 712 provided by a stabilizer setting control 702. Stabilizer setting control 702 is a mechanical input device or which allows a operator of a vessel to select a stabilizer setting including turning stabilizer system on or off. The stabilizer setting control 702 allows a user to select, for example, the level or aggressiveness of stability control provided by the stabilizer system, and can be implemented as, for example, a lever 716, and electronic selector interface 718, a dial 720, among other forms of setting controls. Thus, the stabilizer setting control is a physical device that converts a user input into a signal (e.g. 712) that is provided to the stabilizer loop controller 704. The signal 712 can be an analog or a digital signal, and can be provided over a variety of conductors including a twisted wire pair, a data bus, or a network cable.

The stabilizer loop controller 704 includes, for example, a control loop 708 (circuit) which generates a signal 714 provided to the stability effector 706. The stability effector 706 includes the physical components which are being controlled responsive to the stabilizer control signal 714. For example, the stabilizer effector 706 can be stabilizer fins and the motors or hydraulic actuators that control the position, pitch, and movement of the fins. The stabilizer effector 706 could alternatively be, for example, a gimbaled gyroscope including a motor that spins the rotating mass (flywheel) of the gyroscope, in which case the control signal 714 can control the speed at which the gyroscope mass spins. Another example of a stabilizer effector is a shifting weight which is moved to counteract roll of the vessel.

The stabilizer loop controller 704 can further, in some cases, include an accelerometer 710 which is used by the control loop 708 for generating the stabilizer control signal 714. For example, the accelerometer 710 can be a multi-axis accelerometer that indicates vessel roll and pitch, and the and the control loop 704 is responsive to the accelerometer output to generate stabilizer control signals 714 that cause the stabilizer effector 706 (fins) to counteract the vessel roll and/or pitch. The settings 712 provided to the stabilizer loop controller 704 by the stabilizer setting control 702 reflect the type of stability desired by the vessel operator. In this prior art system the vessel operator must make the decision as to what stabilizer setting to use based on the type of stability the user desires. This requires the vessel operator to know how the stabilizer system responds and then to provide or select the appropriate setting provided to the stabilizer loop controller 704 from the stabilizer setting control 702. This arrangement of a stabilizer system is commonly used, but is operated independent of any other vessel stabilizer system, and requires the vessel operator to select a stabilizer setting and adjust that setting when necessary.

Therefore, a need exists to overcome the problems with the prior art as discussed above.

SUMMARY OF THE INVENTION

In accordance with some embodiments of the inventive disclosure, there is provided a vessel stability controller for controlling a plurality of stabilizer systems of a vessel. The stability controller includes at least one vessel control input configured to receive a control state of a corresponding vessel system. The stability controller can further include a first stability input configured to receive a first operator-selected stabilizer setting for a first stabilizer system of the vessel, and a second stability input configured to receive a second operator-selected stabilizer setting for a second stabilizer system of the vessel. The stability controller can further include a first resource input configured to receive a first resource usage indicating a resource usage by the first stabilizer system, and a second resource input configured to receive a second resource usage indicating a resource usage by the second stabilizer system. The stability controller can further include a first output configured to provide a first learned stabilizer setting to the first stabilizer system of the vessel, and a second output configured to provide a second learned stabilizer setting to the second stabilizer system of the vessel. The stability controller can further include a learning engine configured to generate the first and second learned stabilizer settings upon being trained based on the control state, first operator-selected stabilizer setting, second operator-selected stabilizer setting, first resource usage, and the second resource usage.

In accordance with another feature, the stability controller can further include a wind input configured to receive a wind direction and a wind speed, and the learning engine can be further configured to generate the first and second learned stabilizer settings upon being trained based on the wind direction and the wind speed.

In accordance with another feature, the learning engine can be further configured to generate the first and second learned stabilizer settings upon being trained based on a user-provided constraint that limits one of the plurality of stabilizer systems to a specified operating state.

In accordance with another feature, the stability controller can further include an optimization input configured to receive an operator selection of an operating preference, and the learning engine can be further configured to generate the first and second learned stabilizer settings upon being trained based on the operator selection of the operating preference.

In accordance with another feature, the first stabilizer system is a gyroscopic stabilizer system.

In accordance with another feature, the second stabilizer system is a fin stabilizer system.

In accordance with another feature, the stability controller can further include a third stability input configured to receive a third operator-selected stabilizer setting for a third stabilizer system of the vessel, a third resource input configured to receive a third resource usage indicating a resource usage by the third stabilizer system, a third output configured to provide a third learned stabilizer setting to the third stabilizer system of the vessel, and the learning engine can be configured to generate the third learned stabilizer setting upon being trained based further on the third operator-selected stabilizer setting, and the third resource usage.

In accordance with another feature, the third stabilizer system can be a shifting counterweight stabilizer system.

Although the invention is illustrated and described herein as embodied in a vessel stability control system, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

"In the description of the embodiments of the present invention, unless otherwise specified, azimuth or positional relationships indicated by terms such as "up", "down", "left", "right", "inside", "outside", "front", "back", "head", "tail" and so on, are azimuth or positional relationships based on the drawings, which are only to facilitate description of the embodiments of the present invention and simplify the description, but not to indicate or imply that the devices or components must have a specific azimuth, or be constructed or operated in the specific azimuth, which thus cannot be understood as a limitation to the embodiments of the present invention. Furthermore, terms such as "first", "second", "third" and so on are only used for descriptive purposes, and cannot be construed as indicating or implying relative importance.

In the description of the embodiments of the present invention, it should be noted that, unless otherwise clearly defined and limited, terms such as "installed", "coupled", "connected" should be broadly interpreted, for example, it may be fixedly connected, or may be detachably connected, or integrally connected; it may be mechanically connected, or may be electrically connected; it may be directly connected, or may be indirectly connected via an intermediate medium. As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. The terms "program," "software application," and the like as used herein, are defined as a sequence of instructions designed for execution on a computer system. A "program," "computer program," "instruction code," or "software application" may include a subroutine, a function, a procedure, an object method, an object implementation, an executable application, an applet, a servlet, a source code, an object code, a shared library/dynamic load library and/or other sequence of instructions designed for execution on a computer system. Those skilled in the art can understand the specific meanings of the above-mentioned terms in the embodiments of the present invention according to the specific circumstances

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

Figure 1:
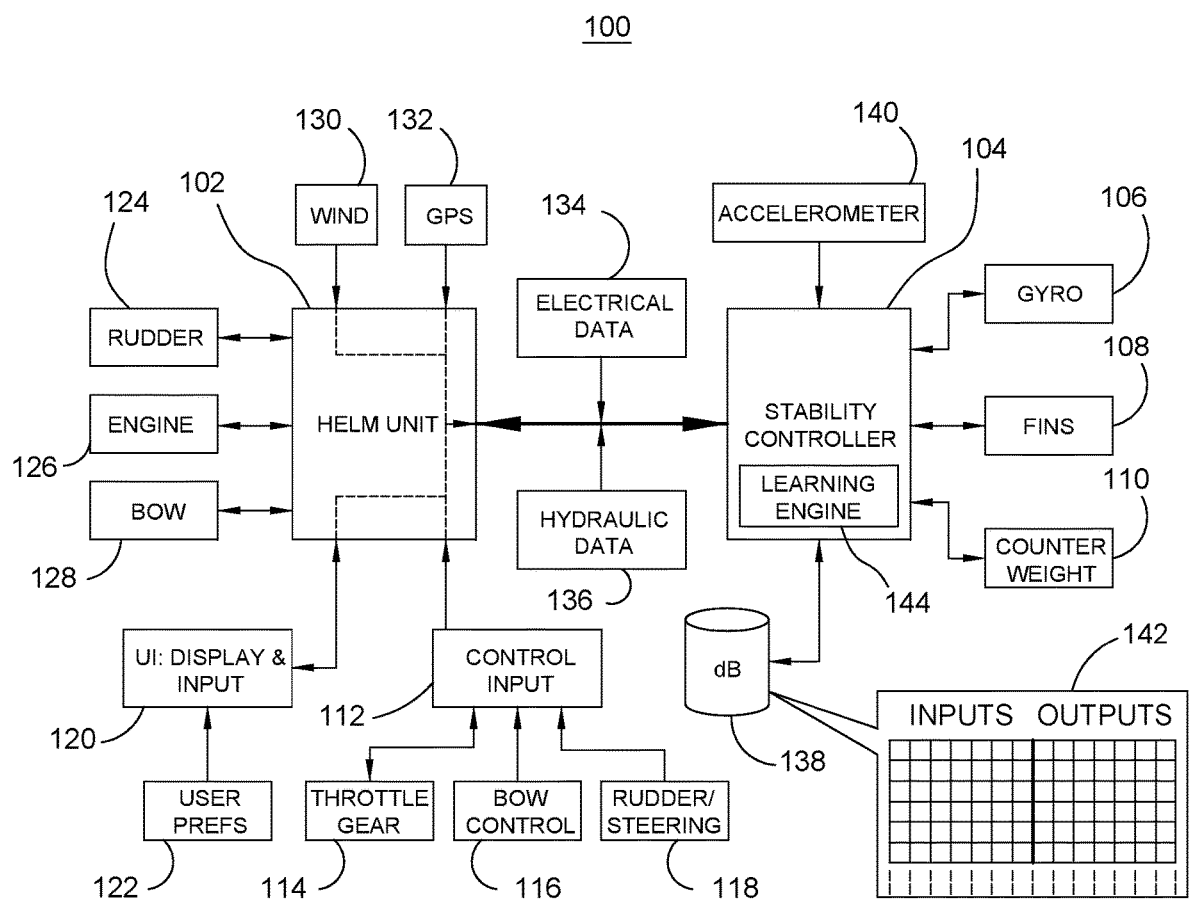
FIG. 1 is a block schematic diagram of a vessel operating system including a learning system configured to learn optimized stability control settings to conserve resource usage under various operating conditions, in accordance with some embodiments.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present disclosure provides a stability controller and system that is capable of controlling multiple vessel stabilizer systems present on the vessel, learning their response and resource usage under various conditions and constraints, and removing the need for an operator or crew member to adjust the stabilizer settings during operation of the vessel. The disclosed system can be used with any vessel and any stabilizer systems that accept control inputs. The system is first trained by manually setting the stabilizer systems manually, the system recording the manually selected stabilizer system settings, recording the resource usage of the stabilizer systems, and recording other inputs such as sea/wave conditions, boat control settings (e.g. throttle, direction). These inputs are applied to a learning engine to train the learning engine using any of the known learning methods (e.g. neural network, support vector machine, Markov decision process engine) by modifying training coefficients so that predicted stability control settings for observed inputs and actual response of the vessel and system match that of the actual setting selected by the operator. The learned data can be adjusted to select optimized stabilizer system settings to conserve resource usage.

FIG. 1 is a block schematic diagram of a vessel control system 100, including a learning system configured to learn optimized stabilizer control settings to achieve a desired stability type under various operating conditions, in accordance with some embodiments. The stability types can include, for example, maximizing ride comfort, minimizing resource usage, minimizing operating sound, and so on. The vessel control system 100 is located on a vessel (e.g. a boat, ship, yacht) that has a helm which includes control mechanisms for operating and controlling various vessel systems such as an engine and a rudder. The vessel control system 100 also includes one or more stabilizer systems that can also be controlled, meaning the degree to which they attempt to counter movement of the vessel resulting from waves, wind, maneuvering, and so on, can be adjusted. The learning system is trained by actual operating input, and actual responses to those input, as they occur during manual operation of the vessel. In time, after sufficient training, the learning system can be used to control the stabilizer systems without the operator/crew having to input or apply settings to the stabilizer system(s). Accordingly, the disclosed system can be installed on any vessel using any stabilizer systems so long as the outputs of the vessel controls, stabilizer system settings, condition inputs, and stabilizer system resource usage can be provided to the learning system. Then the learning system can develop learned data for that particular vessel and the particular stabilizer systems for various operating conditions.

The vessel control system 100 can include a helm unit 102 through which control signals from control actuators pass to the systems being controlled. The signals correspond to a control state for each of the systems being controller. For example, A throttle/gear controller 114 can provide a signal that is routed through a control input 112, to the helm unit 102, which in turn provides engine control signals to an engine 126. The control input 112 is an electrical or other physical connector that connects, for example, the throttle controller output of the throttle controller 114 to the helm unit 102. The term "input" as used herein can refer to either a signal connection, such as a connector, or a signal itself, depending on the context.

Similarly, a bow thruster control 116 can be used to control a bow thruster 128, and a rudder or steering control 118 can be used to control a rudder 124. In some embodiments the control input 112 can be omitted and the controls 114, 116, 118 can connect directly to the helm unit 102, and/or their respective system being controlled. Thus, for example, the amount of throttle used corresponds to a control state of the throttle, which is represented in a signal, which can be a digital signal or an analog signal (e.g. voltage level). The throttle controller 114 can be a stick actuator that is moved to an off position or a "full" position, or somewhere in between, as a control state, resulting in a corresponding control signal being output by the throttle controller 114. The control state can be represented as an analog value or a discrete value. Each of the controls 114, 116, 118 are used to adjust or change the operation of the corresponding vessel system (e.g. engine, bow, rudder).

The helm unit 102 can, in some embodiments, receive an input signal from an anemometer 130 to indicate wind speed and wind direction, and location input data from a satellite positioning receiver 132 using the Global Positioning System (GPS) satellite constellation. The location data produced by the positioning receiver 132 can also include a heading indication data produced using a compass, which can be a separate device from the location receiver 132. Wind and location data can be presented to the operator in a display or displays or equivalent indicators that are part of a user interface system 120. The user interface system 120 also allows a user to provide inputs (control selections) and preferences 122, such as a destination, as well as to control the stabilizer systems, such as a gyroscopic stabilizer system 106, a fin stabilizing system 108, and a counterweight system 110. Furthermore, the user interface 120 allows an operator to see the settings and operating parameters of various systems. For example, parameters such as engine temperature, engine RPMs, rudder angle, stabilizer system settings, wind direction and speed (true and apparent), speed over land, and so on. In addition, the resource usage of the electrical system 134 and the hydraulic system 136 can be displayed on one or more display devices of the user interface system 120. The electrical system 134 can provide data that indicates various electrical parameters, such as battery status, electric current draw of various systems and components, generator status, and so on. The hydraulic system 136 can provide data that indicates the status of various hydraulic systems, including, for example the fin stabilizer 108 and the counterweight stabilizer 110.

Connected to the helm unit 102 is the stability controller 104, which is capable of operating in either a pass-through mode or an active control mode with respect to the stabilizer systems 106, 108, 110, depending on whether it is in a training mode or the active control mode. In general, the stability controller 104 first operates in a training mode in order to acquire training data based on operator control of the vessel and operator input to the stabilizer systems, other data such as vessel system controls (throttle, rudder), environmental condition data (e.g. wind direction, speed), as well as the results (e.g. resource usage, changes in vessel roll/pitch/yaw). Once the learning engine of the stability controller 104 is suitably trained, it can operate in the active control mode where it provides learned stabilizer settings to the various stabilizer systems 106, 108, 110 in accordance with an operator selected preference, such as, for example, ride comfort or resource conservation. Furthermore, the stability controller 104 can adjust and optimize learned parameters by varying stabilizer settings during operation and evaluating the results in resource usage and stability performance.

The gyroscopic stabilizer 106 operates a rotating gimbaled disk that is rigidly mounted to the frame of the vessel, and produces a counter torque in response to the vessel rolling due simply to the gyroscopic effect of the rotating mass of the disk. The speed of rotation of the disk can control the amount of counter torque produced in response to movement of the vessel, but principally in response to roll of the vessel. Rotation speed, and therefore resource usage, can be adjusted based on the sea conditions and the learned reaction of the vessel to those conditions (e.g. an estimate of the amount of roll to be experience based on wave height, period, and angle of incidence on the vessel).

The fin stabilizer system 108 includes fins which extend outward from the hull of the vessel, below the water line, at a plane angle that can be changed in response to movement of the vessel in roll and pitch to counteract the roll and pitch. The plane angle of each fin is controlled by rotating the fin about an axis relative to the vessel so as to adjust the angle of lift created by the fins as the vessel moves through the water. When underway, then, the effectiveness of the fins corresponds with the speed through the water, and thus at low speed, more angle is needed to create a counter lift compared to the angle needed at higher speeds. Accordingly, at low speeds, the fin stabilizer system 108 uses more resources (power) to provide a given degree of stabilization than is required at higher speeds.

The counter weight stabilizer 110 uses hydraulic actuators in response to vessel roll to move a weight from a center, neutral location in the vessel in opposition to detected roll-induced acceleration. The acceleration of gravity acts on the weight to counter the roll of the vessel. Thus, the heavier the sea conditions, the farther and faster the weight has to be moved to counteract roll.

All of the vessel stabilizer systems 106, 108, 110 can be set to selected operating levels in order to compromise their stability effectiveness for the sake of resource conservation. Further, the fin stabilizer system 108, if capable of "at anchor" operation, can be selectively disabled and the fins retracted against the hull if, for example, swimmers or divers are near the vessel in the water, to avoid injuring those people. Each of the stabilizer systems 106, 108, 110 include their own sensors and control system. That is, for example, the fin stabilizer system 108 includes one or more accelerometers to detect changes in vessel roll and pitch. The fin stabilizer system 108 includes a control loop that uses the acceleration input as feedback to adjust the fin angle, as is well known. The degree to which the feedback control loop is responsive can be adjusted by a user setting based on user preference and desired resource usage. Some users may tolerate vessel roll better than others, and would prefer to conserve resources (e.g. load on the engine/generator/battery). The operator can also control stabilizer settings of the stabilizer systems 106, 108, 110 independently. So, for example, an operator can reduce or even stop the spin rate of the gyroscopic stabilizer 106 while the vessel is moving at a high rate of speed in favor of fin stabilization due to the effectiveness of fin stabilization at higher speed. On the other hand, the drag created by fins at high speed may be undesirable, so the counter weight stabilizer system 110 may be more desirable under certain conditions. The operator of the vessel can therefor adjust the operation of each of the stabilizer systems 106, 108, 110 based on experience and preference with respect to both stabilization and resource usage.

The stability controller 104 is configured to receive all of the vessel control settings (e.g. throttle control, rudder control), environmental input (e.g. wind direction/speed, vessel direction/speed) as well as user preference settings, stabilizer system settings, electrical system usage, and hydraulic system usage). Further, the stability controller 104 can include an input to receive acceleration data from an accelerometer 140 that can be independent of those used by the various stabilizer systems 106, 108, 110. The acceleration data of the accelerometer 140 can be used by the stability controller 104 to determine wave period and wave height, by detecting upward and downward acceleration events and determining a period and magnitude of regularly occurring patterns.

Figure 7:
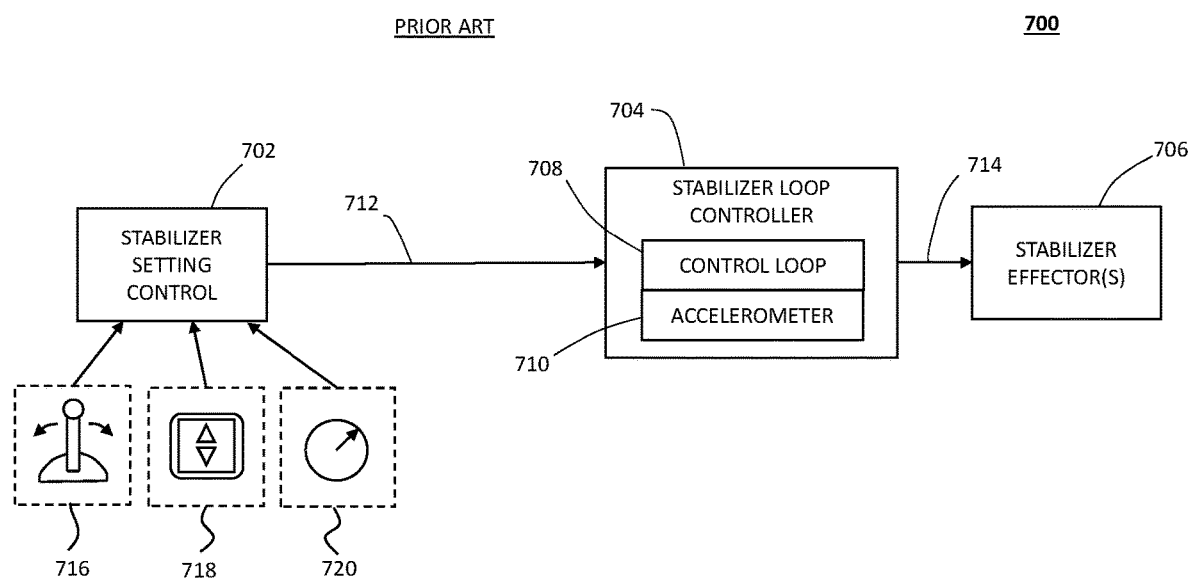
FIG. 7 shows a block schematic diagram of a prior art vessel stabilizer system.

The stability controller 104 can operate in a passive, training mode, where the stability controller 104 "observes" the various vessel control settings, stabilizer settings, environmental parameters, and resource usage data (e.g. from 134, 136). The stability controller 104 is configured to use these inputs (signals/data) as training data for a machine learning engine 144 to produce the learned stabilizer settings for each of the various stabilizer systems under various conditions. The input data (e.g. control settings, stabilizer settings, vessel roll/pitch) can be used to map input state to learned stabilizer system settings that seem preferred for given input state and to develop learning coefficients in the learning engine in order to generate stabilizer system control settings for similar conditions as indicated by input state, as well as for conditions for which there is no training data. Thus, the stability controller 104 maintains training data and learning coefficients in a database 138 in order to map 142 input states to desired outputs (stabilizer system settings). The stability controller 104 can use any of several well-known learning engine types (e.g. neural network, support vector machine, Markov decision process engine). It is important to note that the stability controller 104 does not directly control the dynamic operation of the stabilizer systems 106, 108, 110. Rather, each of the stabilizer systems 106, 108, 110 have their own controls operable by a person to provide a setting or control signal to the respective stabilizer system 106, 108, 110, as shown in FIG. 7. The stability controller sits between the manually operated control input (e.g. buttons, levers, computer input, etc.) and the control circuitry (loop controller) of the stabilizer systems that use the signals from the control inputs to adjust the control of the effectors of the stabilizer systems.

When the learning engine 144 of the stability controller 104 becomes sufficiently trained, it can operate in an autonomous or active control mode, reacting to the various inputs (signals/data), but relieving the operator of the vessel from selecting optimum stabilizer system settings for the various stabilizer systems 106, 108, 110., and adjusting them when conditions change. User inputs can disable one or more of the stabilizer systems 106, 108, 110 for various reasons. For example, an "at anchor" fin stabilzier system 108 operating mode can be disabled if there are people in the water around the vessel while at anchor. Furthermore, the learning engine can learn optimized resource usage to achieve similar stability performance over what an operator of the vessel might select. For example, the learning engine training can reveal that operating one stabilizer system 106, 108, 110 at a given setting can achieve a similar stability effect as operating another stabilizer system 106, 108, 110 that may be preferred by the operator due to ignorance or misunderstanding. The machine learning engine can also include an adjustment mode where, while in control of the stabilizer system settings, the stability controller can momentary vary the setting(s) provided to the stabilizer systems 106, 108, 110 in order to determine if such changes further optimize the effectiveness of the stabilizer systems 106, 108, 110.

Thus, the stability controller 104 learns the effect of the various stabilizer systems 106, 108, 110 for various input conditions and various settings for the stabilizer systems 106, 108, 110. The effect of stabilizer settings can be determined using the accelerometer 140 feedback, as well as resource usage such as data from the electrical system 134 and data from the hydraulic system 136. The stability controller 104 can include several inputs (connectors) that are each configured to receive various types of input signals. For example, the stability controller 104 will include one or more vessel control input connectors that are each configured to receive a control state of a corresponding vessel system, such as throttle level, rudder angle, and so on. The stability controller 104 can further include stabilizer input connectors that are configured to receive operator-selected stabilizer settings (signals/data) for the various stabilizer systems 106, 108, 110. For example, the stability controller 104 can receive stabilizer settings (signals/data) for the stabilizer systems 106, 108, 110 from the helm unit 102. In other embodiments the stability controller 104 can receive stabilizer settings independently, from a controller or actuator device (e.g. lever, dial, switch) that is configured to provide a setting to a respective one of the stabilizer systems 106, 108, 110. These are the operator-selected stabilizer settings and they are used in the training of the learning engine of the stability controller 104. Similarly the stability controller 104 can include one or more resource input connectors the are configured to receive resource usage information or data for each of stabilizer systems 106, 108, 110. Likewise, the stability controller 104 can include an input connector for wind 130 data indicating wind speed and direction, a location input connector to receive location and heading data (e.g. from GPS 132). Further, the stability controller 104 can receive operator preferences as to what type of stability is to be used (e.g. ride comfort, resource conservation). All of the input connectors can be independent electrical/data connections, or they can be received over a data bus, such as from a helm unit 102 as shown, or any other known means of communicating signals/data.

The stability controller 104 includes one or more processors (e.g. microprocessors) and memory that are configured, by executing suitably designed instruction code, to instantiate and operate a learning engine 144, including the data handling functions necessary to acquire, process, and store data from the various input connectors received from the various systems. Input data, raw and processed (conditioned) can be stored in a memory such as the database 138 or other suitable storage media. Thus, the learning engine 144 is a combination of hardware and software, where the instruction code of the software is configured to operate the hardware accordingly. The learning engine 144 can initially be configured using an interface to identify and provision the input sources, and the output signals (stabilizer control settings) to be produced by the stability controller 104. The output signals of the stability controller 104 are provided over physically connections to the respective stabilizer systems 106, 108, 110, and can reflect learned stabilizer settings for each of the stabilizer systems 106, 108, 110. Thus, the learning engine 144 is configured to generate the learned stabilizer settings upon being trained based on the control state(s), operator-selected stabilizer settings, and resource usage, as well as environmental conditions and vessel system settings (e.g. throttle). Other input signals or data can be further used to train the learning engine 144 as well, such as determining wind direction, wave period, wave height, heading, speed, and so on.

Figure 2:
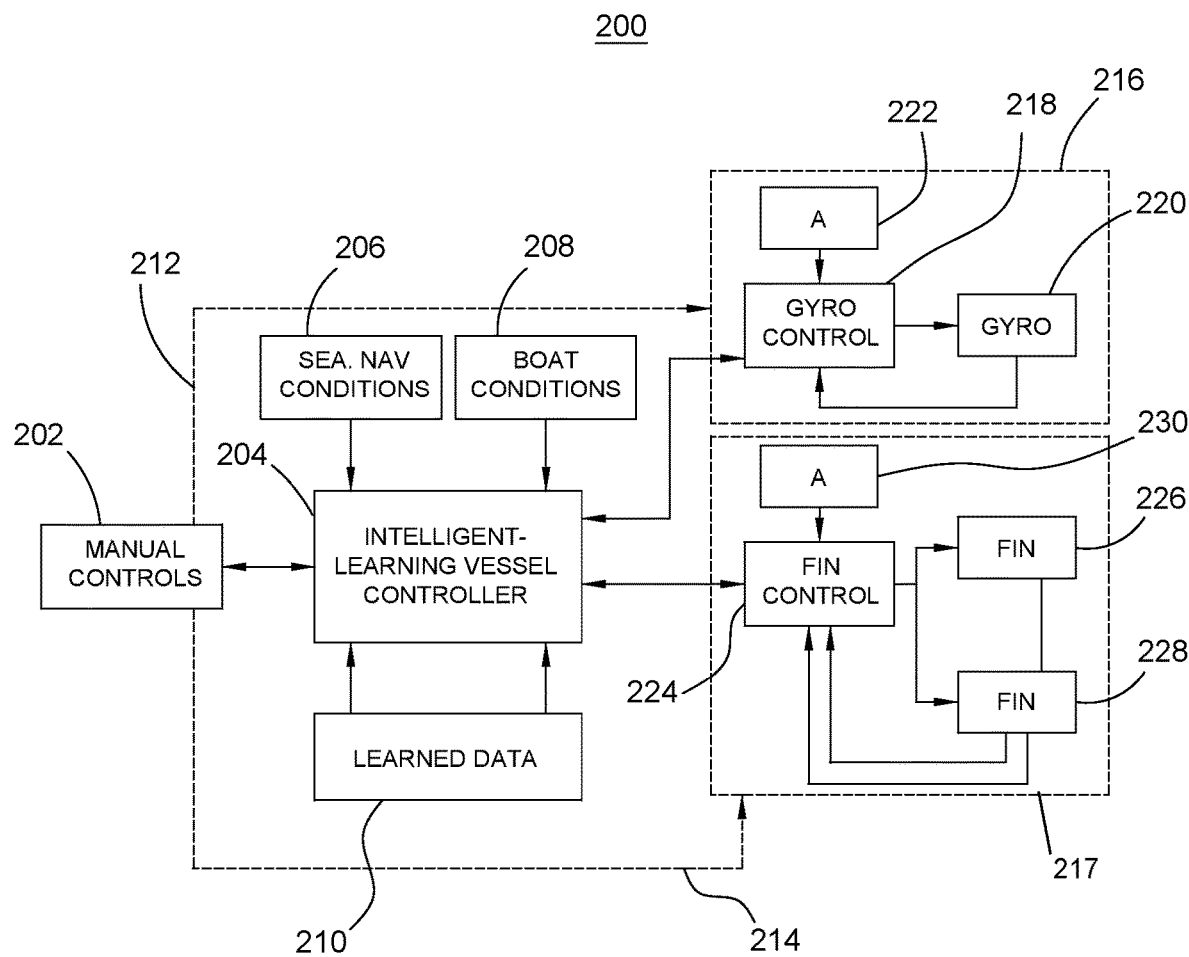
FIG. 2 is a block schematic diagram of a vessel control system that receives operating input and selects stabilizer systems settings based on learned stability data, in accordance with some embodiments.

FIG. 2 is a block schematic diagram of a vessel control system 200 that receives operating input and selects stabilizer system settings for the available stabilizer systems on the vessel based on learned stability data for those specific stabilizer systems and the vessel's response to the operation of those stabilizer systems under various conditions, in accordance with some embodiments. The vessel stabilizer system 200 is similar to that of vessel stabilizer system 100 of FIG. 1, but can be used in less sophisticated vessels. The system 200 can include manual controls 202 (equivalent to stabilizer setting control 702 of FIG. 7) that are used to select settings (i.e. signal level/value) for on-board stabilizer systems such as a gyroscopic stabilizer system 216 and/or a fin stabilizer system 217. Using the manual controls 202 a vessel operator can provide setting input 212, 214, respectively, to the gyroscopic stabilizer system 216 and the fin stabilizer system 217. These setting inputs 212, 214 are signal or control values that can be provided from the manual controls 202 through an intelligent learning vessel controller 204 (ILVC), that is operably connected to the gyroscopic stabilizer system 216 and the fin stabilizer system 217, and can also be further operably connected to other stabilizer systems, such as a counterweight stabilizer system. In operation, the manual controls 202 can provide signals either through the IVLC 204 to the stabilizer systems 216, 217, or to the IVLC 204 and the stabilizer systems 216, 217 in parallel. However, the setting signals 212, 214 from the manual controls 202 must be provided to both the IVLC 204 and the stabilizer systems 216, 217, and the IVLC 204 must be operably connected to the stabilizer systems 216, 217, meaning the IVLC 204 can provide signals to the stabilizer systems 216, 217. Neither the manual controls 202 or the IVLC 204 control the autonomous operation of the stabilizer systems 216, 217, rather they provide settings that are used by the stabilizer systems 216, 217 to govern their autonomous operation.

The IVLC 204 is substantially similar to the stability controller 104 of FIG. 1, and includes a learning engine that operates by acquiring data 210 during manual operation, which is then used to train a machine learning engine to select output settings for the stabilizer systems 216, 217 for given conditions and constraints later, after it has been sufficiently trained. The IVLC 204 also receives environmental condition data 206, in addition to, and contemporaneously with the data received from the controls during manual operation, which can include data regarding wind direction, wind speed, sea conditions (wave period, amplitude), and so on. The ILVC 204 can further receive vessel data 208 regarding present vessel operational settings, including, for example, engine throttle, rudder angle, heading, vessel speed, vessel angle to wind direction, and electrical and hydraulic usage, among other input data. The machine learning engine of the ILVC 204, in one mode, operates in a training mode where it receives input data and observes the settings applied to the stabilizer systems 216, 217 manually, and adapts the learning engine coefficients to train the learning engine to have equivalent output signal values. After being suitably trained, the ILVC 204 can then directly provide settings (i.e. control signal values) for the stabilizer systems 216, 217 based on other control input data for the vessel systems as well as weather and sea condition data, and any constraints the user may apply. The stabilizer settings are used by the stabilizer systems 216, 217 to adjust their control feedback, or other operating parameters, or to simply activate them or deactivate them at suitable times to conserve resources.

The gyroscopic stabilizer system 216, for example, operates a flywheel comprised of a spinning disk or flywheel mass 220 under control of a motor control unit 218 that includes an accelerometer 222 or similar feedback sensor for gimbal torque braking. In some embodiments the spin rate can be adjusted based on the sensed roll of the vessel as indicated by the accelerometer 222. Settings for the gyroscopic stabilizer system 216 can control the spin rate of the disk mass 220, as well as the cant or tilt of the axis around which the disk mass 220 rotates, and the gimbal torque applied to the disk mass 220. In some embodiments, the setting for the gyroscopic stabilizer 216 can simply be to either turn the system on or off. For example, if the indicated destination will take less time to reach than the time needed to spin up the disk mass 220 to its operating spin rate, it would be a waste of resources to turn the gyroscopic stabilizer system 216 on, and it is would be more efficient to simply use the fin stabilizer system 217.

In some embodiments, the gyroscopic stabilizer 216 can provide feedback regarding its operating state. Given that these systems can take on the order of 15-45 minutes to spin up to their operating spin rate, one of the training parameters can be the flywheel spin rate, which can be used to adjust other stabilizer systems such as the fin stabilizer system 217 over time as the flywheel increases spin rate. For example, when underway, at a high speed, fins are not desirable because of their drag. However, given the time it takes for a gyroscopic stabilizer to reach its operating spin rate, fins can be used initially, and then withdrawn/folded back when the disk 220 of the gyroscope 216 reaches a sufficient spin rate, even before it reaches it operating spin rate. Thus, time after initializing a gyroscopic stabilizer can be one of the parameter used by the learning engine that is reflected in the learned data 210 to adjust operation of the fin stabilizer system 217.

The fin stabilizer system 217 typically includes two or more fins 226, 228 which extend outward from the hull of the vessel and which provide a plane surface that can be angled about a fin axis. In some embodiments the fins 226, 228 can be withdrawn or folded against the hull of the vessel to reduce drag, allow for docking, or to avoid injury to persons in the water around the vessel. Some fin stabilizers can also raise and lower the fins while fully extended to provide some stability when the vessel is not moving, or not moving fast enough to provide sufficient lift force, which is also known as "at anchor." The "at anchor" system can have an advantage over a gyroscope stabilizer under relatively calm conditions where, for example, the vessel stability is only occasionally perturbed by a passing vessel wake since the fins only need to move briefly, as opposed to the gyroscope running continuously. The fins 226, 228 are controlled by a fin control unit 224 that is responsive to an accelerometer 230 or similar sensor (e.g. gyroscopic sensor) that indicates the roll/pitch of the vessel. The fin controller 224 uses the output of the accelerometer 230 as feedback to adjust the movement and positions of the fins 226, 228. Generally, the fins 226, 228 are operated in a complementary fashion; if one is controlled to angle its lift upwards, the fin or fins on the opposite side of the vessel can be controlled to angle their plane so that their lift is downwards. Together, they create a balanced counter torque to counter the roll and pitch of the vessel cause by wave incidence on the hull of the vessel. The fin controller 224 operates on its own control loop, where the ILVC 204 is not controlling the fins 226, 228 directly, rather the ILVC 204 provides a setting (signal) to the fin controller 224 that is used in the control feedback loop of the fin controller 224 to operate the fins 226, 228 in accordance with the setting. The setting can adjust the aggressiveness of control of the fins 226, 228 by adjusting the control feedback loop used by the fin controller 224. The setting is selected, initially, by the vessel operator while the IVLC 204 is in a training mode, and once sufficient training data is processed, the ILVC 204 can operate on its own.

An exemplary use case for a machine learning stabilizer setting controller, such as the ILVC 204 and the stability controller 104 would be a vessel getting underway from anchor. While a gyroscopic stabilizer may be, ultimately, ideal, given the time it takes for the unit to spin up to operating spin rate, initially, then, another system will be used as the gyro spins up to operating speed (e.g. revolutions per minute). Thus, a fin controller system or a shifting counterweight system can be used while the gyro is spinning up to operating speed. As the gyroscopic stabilizer approaches its operating spin rate, the setting for the other stabilizer system can be reduced, step-wise, over that time until ultimately, only the gyroscopic stabilizer has reached its operating spin rate. In another case, conditions may be such that operating only the gyroscopic stabilizer is not enough to produce a preferred stability. Thus, some conditions and user preferences may dictate that two or more stabilizer systems operate at the same time, and the settings can then be selected to optimize comfort or resource usage.

In some embodiments, the ILVC 204 can provide a user interface to allow a vessel operator to indicate a mode of operation (a type of stability) for which the stabilizer systems 216, 217 are being optimized. For example, modes such as resource conservation, noise minimization, stability maximization, vessel loading, and other, even user-created modes for other preferences can be defined for training. Upon training, the vessel operator selects the appropriate stability type, and then sets the stabilizer systems to levels corresponding to that mode, or what is the operator's best guess. During training the ILVC 204 can take in data related to environmental conditions, vessel response, vessel resource usage, and associate this data with the selected operating mode. The ILVC 204 can, while in the training mode, adjust the stabilizer settings to evaluate the effect and determine whether an improvement can be made over the operator selected stabilizer settings. The cooperation between multiple stabilizer systems allows installation of smaller stabilizer systems than would be installed on a vessel using only one stabilizer system. As a result, there can be a substantial savings in space on the vessel, in addition to providing some redundancy in the event one of the stabilizer systems fails.

Figure 3:
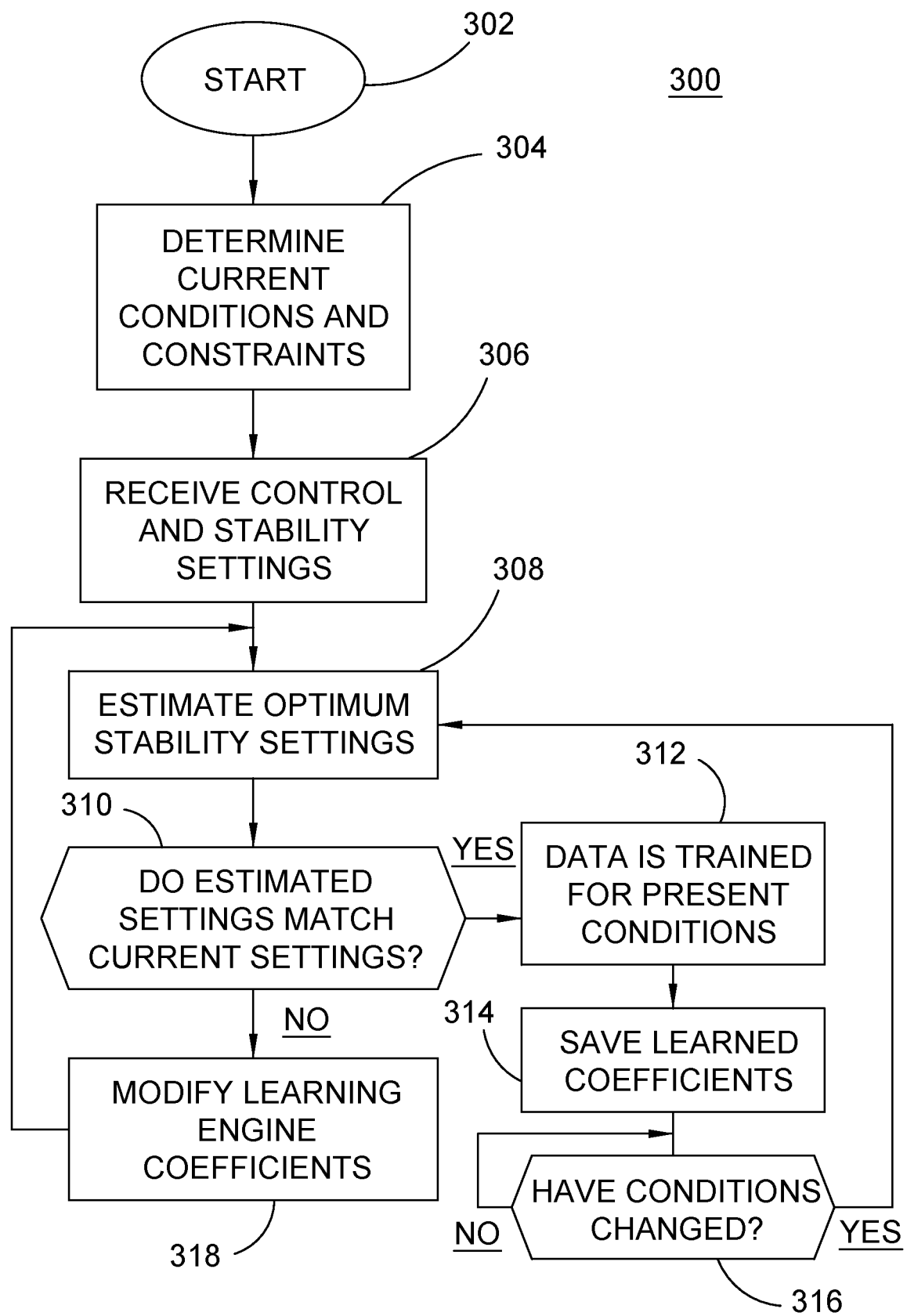
FIG. 3 is a flow chart diagram of a method for training learned data based on operator input, stabilizer system resource usage, and operating conditions, in accordance with some embodiments.

FIG. 3 is a flow chart diagram of a method 300 for training learned data in a machine learning engine for controlling multiple stabilizer system settings, based on operator input, selected mode of operation, stabilizer system resource usage, and operating conditions, in accordance with some embodiments. At the start 302, the method assumes a vessel has multiple stabilizer systems that can be set, either to simply on/off, or to degrees or steps of control. Further, that a stability controller including a machine learning engine that is installed in the vessel in a configuration such as that shown in FIGS. 1-2 that receives control input, vessel information, environmental conditions, as so on. The method 300 is intended to be used with essentially any stabilizer systems on most vessels, and not any particular stabilizer systems, meaning the stability controller can be installed on any vessel having two or more stabilizer systems.

Upon commencing operation initially, the machine learning engine of the stability controller will be untrained. The output signals provided through output connectors can be designated by an operator and connected to corresponding stabilizer systems, and the stability controller can act as a "pass through." That is, control signals for the stabilizer systems pass through the stability controller so that the stability controller can observe how the user or operator of the vessels sets the stabilizer system settings for present conditions and the mode of operation (i.e. type of stability), and then observe and record the resulting effect on actual stability and resource usage. In step 304 the stability controller receives various input signals/data at corresponding input connectors that can include current conditions and constraints, as well as a mode selection. The condition data captured in step 304 can include data for wind direction, wind speed, vessel heading, vessel destination or trip time, sea conditions (wave direction/amplitude/period), as well as resource usage of the various stabilizer systems and the state of the stabilizer systems (e.g. gyroscope spin rate relative to optimum spin rate), as well as any constraints that may be imposed by the vessel operator (e.g. maintain fins folded and off). The mode selection allows the operator to indicate select a mode or type of stability to be used (e.g. minimize noise, maximize stability, minimize resource usage, and so on). In step 306 the stability controller further receives, or observes, the stabilizer system settings (signals) chosen by the vessel operator. The stabilizer system settings selected by the operator are, at least initially, used as the output signal values that the machine learning engine attempts to achieve by operating the learning engine. Thus, in step 308, the learning engine produces an output signal value based on the input signals and data received in step 304. The output signal value is then an estimate of stabilizer system settings based on the input data and values received in step 304. In step 310 the machine-produced stabilizer system setting signal values are compared to the actual, human selected setting signal values of step 306. If there is a sufficient match, then it is determined that, at least for the particular present input data of step 304, the machine learning coefficient data is sufficiently trained in step 312, and the learning or learned coefficients are saved in step 314. In step 316 the method 300 determines if the conditions have changed substantially, based on input data. When, in step 316, it is determined that the conditions have sufficiently the method 300 can return to either step 308 by arrow 320, or step 304 by arrow 322, depending on whether the machine learning engine has already considered conditions close to those that have changed. For example, if the changed conditions sufficiently match a set of conditions that have already been trained before, then arrow 320 can be followed. If the changed conditions are new conditions that have not been trained before, then the method can follow arrow 322. Similarly, if the vessel operator changes the stabilizer settings, the loop of arrow 320 can be followed. When, in step 310, the estimated stabilizer system setting values are substantially different from those applied by the vessel operators (in step 306), then in step 318 the machine learning engine can modify the learning engine coefficients in an attempt to produce an output value that sufficiently matches that setting value provided by the vessel operator.

The stability controller can use any of several machine learning engines. The various machine learning engines link input values to output decision values by a mathematical relationship, typically involving one or more intermediate decision levels between the inputs and outputs. At each decision level coefficients are adjusted to weight the value of an input relative to an output. Over time, and variation in input conditions, the coefficients and decision logic will faithfully reproduce the settings that the vessel operator would select, if not better settings that improve the desired performance for the selected mode, under the present conditions. Further training can be conducted to optimize the output values based on user preferences or constraints. For example, if the vessel operator wants to minimize resource usage (e.g. electric power), then the learning engine can have a set of decision coefficients for optimized resource conservation. The machine learning engine can develop and maintain sets of coefficients for optimizing passenger comfort, vessel speed, and so on. The coefficients can be used in various learning structures such as a neural network, a hidden Markov model, and so on. These can be constraints selected by the vessel operator. Furthermore, other constraints can be selected, such as not using a particular stabilizer system when it is in need of repair, for example. Once some training has been performed for some conditions, the machine learning engine can be used to select stabilizer setting values for conditions that have not been specifically trained, either by trying simple interpolation, or applying a general rule such as large waves require more stability action (e.g. faster gryo spin, more aggressive fin plane angle, etc.).

Figure 4:
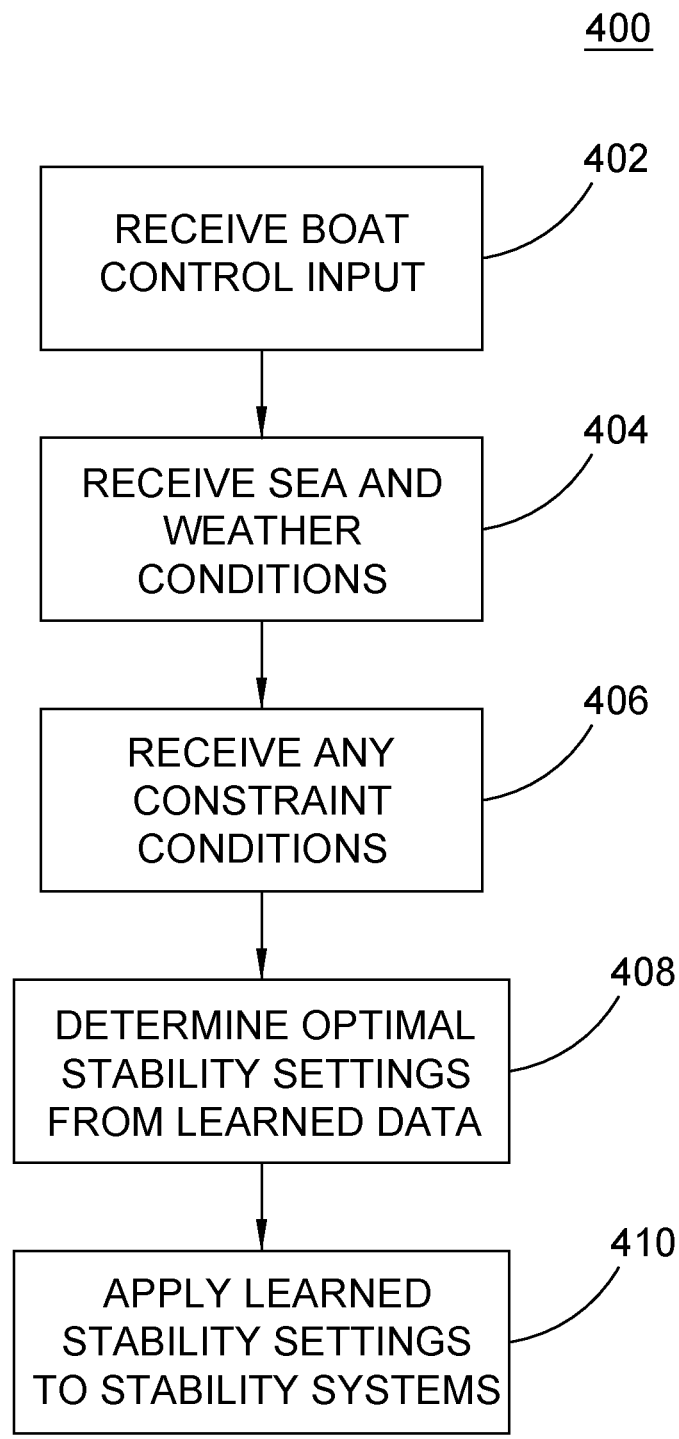
FIG. 4 is flow chart diagram of a method of controlling vessel stabilizer systems of a vessel using learned stability data to optimize resource usage for present operating conditions, in accordance with some embodiment.

FIG. 4 is flow chart diagram of a method 400 of controlling vessel stabilizer systems of a vessel using learned stability data to optimize resource usage for present operating conditions, in accordance with some embodiments. Resource usage is simply one constraint that can be imposed on the system, and for each constraint or combination of constraints a different set of outputs in the form of settings for the stabilizer systems can result. It is assumed that the vessel has a stability controller including a machine learning engine installed on the vessel that is configured to provided settings (e.g. control values or signal level) to the two or more stabilizer systems on the vessel based on a variety of input condition data and user constraint data. User constraints can be entered by a user interface (e.g. 120 of FIG. 1) by the vessel operator. In some embodiments the selection of constraints causes the stability controller to use a set of decision coefficients specific for the constraint. In other embodiments the constraints themselves can be an input data.

In step 402 the stability controller receives vessel operating control input (data/signals) at respective input connectors, which include engine throttle, heading, rudder angle, trim position, and so on. In step 404 the stability controller also receives input data regarding sea and weather conditions. Sea conditions can be determined by an on board system that identifies wave patterns (e.g. up and down motion, rolling motion) and properties such as average wave height, wave period, angle to the vessel, and so on. In step 406 any input constraint conditions and a mode selection can be identified as another input or to select a set of decision coefficients particular to that constraint. In step 408 the machine learning engine applies the inputs to a decision engine that has been properly configured using the decision coefficients to produce an output in the form of a setting for each of the various stabilizer systems on the vessel. In situations where the inputs represent a new set of conditions not previously trained, the decision engine can apply rules to select outputs. The rules can be, for example, to interpolate the selected output from a set of trained input values based on the difference between the trained input values and the present input values for the previously untrained conditions. For example, if the vessel have never operated in seas with a wave height of X, then amplifying the output by a ratio equal to X/X', where X' is a previously trained wave height, can be a first approach. Then the learning engine can vary the stabilizer setting outputs to determine the effect, and decide whether an improvement can be found. In addition, in some embodiments, the stability controller can adjust other vessel system operating settings, such as, for example, engine throttle, rudder position, and so on in an attempt to increase the effectiveness of the stabilizer systems.

Further, in this mode, the stability controller can operate in an override mode where any manual selection of a control instantly overrides the stability controller's output signal. In step 410 the output signals are applied to the corresponding stabilizer systems. The method 400 can be iterative, where if control settings of step 402, the condition inputs of step 404, or the constraint input of step 406 change, then the process can repeat to adjust the output of the stability controller. When the stability controller is operating in override mode, an indicator can be provided so that the vessel operator knows the override mode is active. In some embodiments, the override mode can be the default mode, such that any operation of the controls by the vessel operator will cause the stability controller to pass signals through to the stabilizer systems.

Figure 5:
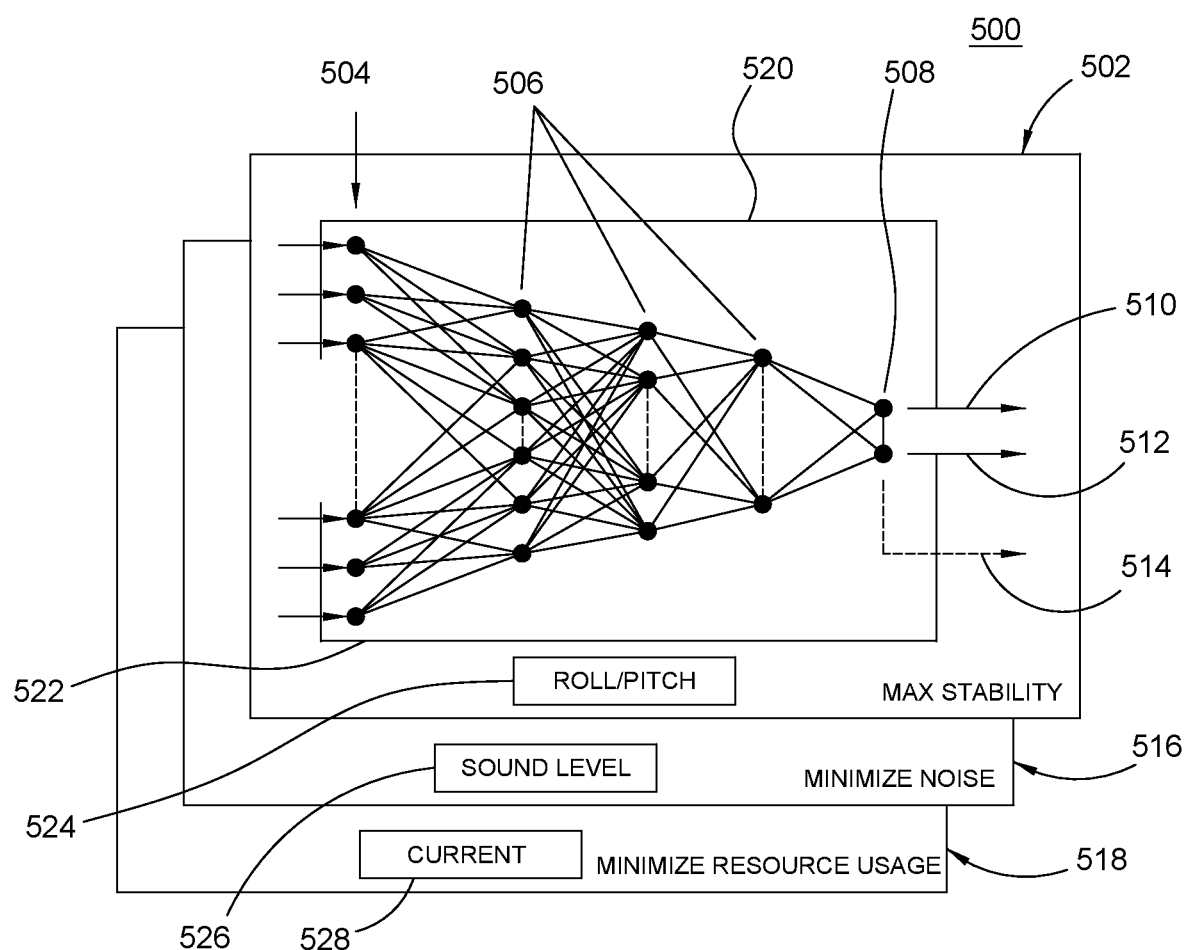
FIG. 5 shows a series of neural network configurations for various modes of operation of multiple stabilizer systems of a vessel, in accordance with some embodiments.

FIG. 5 shows a series of neural network configurations 500 for various modes of operation of multiple stabilizer systems of a vessel, in accordance with some embodiments. A neural network is useful in an adaptive control system, such as a system of cooperatively operating two different stabilizer systems in a vessel to achieve a desired mode of operation which adjusts stability control to optimize some aspect of operation, such as overall stability, noise, resource usage, and so on. A neural network is an example of a learning structure that maps a set of inputs to a set of outputs through one or more layers of interconnected nodes that are weighted through training to produce an output or outputs. The weighting can be adjusted to indicate the relative importance of the effect of varying a given input on the desired output or outputs. Thus, each neural network can be defined by a plurality of inputs, and weighting coefficients for the nodes of the intermediate layer or layers between the input node layer and the output node layer.

The learning engine of the stability controller can maintain separate neural networks for each of the various modes of operation. For example, a first neural network 502 can be used for maximizing stability. A plurality of input nodes at an input layer 504 each correspond to a different input. The inputs can be, for example, engine or throttle level, rudder angle, wind magnitude, wind direction, wave magnitude, wave angle of incidence, geo location, electricity usage data for each of the stabilizer systems, hydraulic usage data for fin stabilizer system, and so on. Inputs can be defined by the vessel operator in an interface provided by the stability controller. At the output layer 508 there is an output for each stabilizer system. In particular here there are two outputs 510, 512. Output 510 can be a control signal (analog, digital, or parameter vector) that is provided to a gyroscopic stabilizer system, and output 512 can be the control signal for a fin stabilizer system. One or more intermediate layers 506 can each have a series of interconnected nodes that each represent a coefficient weight. The output 510, 512 can be fed back 520, 522 to the inputs 504, and thus each input can be a vector of the two output values (or vectors), and the external input, in the form of [I, O1, O2], where I is an external input (e.g. throttle level, wind magnitude, etc.) and the outputs O1, O2 are outputs 510, 512. Each mode of operation can have its own neural network, thus there is shown additional neural networks 516, 518 for optimizing noise, and minimizing resource usage such as electrical current, respectively. Each of the neural networks 502, 516, 518 can be developed separately and stored in a database of the stabilizer system, and have a different controlling parameter. For example, neural network 502 maximizes stability, thus it seeks to minimize roll/pitch parameters 524. Neural network 516 minimizes noise levels on the vessel (e.g. for night passage/sleep) and so it seeks to minimize a sound level parameter 526, which can be measured using one or more microphones in specific locations in the vessel. Neural network 518 seeks to conserve resources, such as electric power, so a current draw parameter 528 is controlling in configuring the neural network 518. When the vessel operator selects a mode of operation, then the corresponding neural network is retrieved and loaded for operation, or created if it did not previously exist. In creating a new neural network, the vessel operator can select, in an interface of the stability controller, the parameter or parameters of vessel operation that are controlling in configuring the neural network. In addition to stabilizer system outputs 510, 512, the stability controller, in some embodiments, can be allowed to control another system of the vessel in order to optimize stability operation, and indicated by output 514. For example, increasing the speed of the vessel in water by a small amount may allow a fin stabilizer system to operate more effectively. Thus, in a maximum stability operating mode, the stability controller can increase the speed of the vessel by a throttle control.

In a training mode, in order to initialize the neural network, the stabilizer system controls are manually set by the vessel operator and the stability controller uses the manually selected stabilizer setting values for the different stabilizer systems as the outputs 510, 512. During operation, the various inputs and the selected setting used as the outputs in outputs 510, 512 are used to configure the coefficients in the middle layer(s) 506. That is, the stability controller invokes an iterative process of adjusting coefficient values of the nodes in the middle layers 506 until the outputs at output layer 508 match the manually selected stabilizer settings. This process can be performed in the background by capturing a set of input values at a point in time, and processing the network to produce an initial set of coefficients. When an input value change (by a preselected threshold amount), then the processing can be repeated, using the initial network determination as a base. The same is true when the vessel operator changes the stabilizer settings. Thus, over time the network will develop to adapt to changes in input values to produce the best output values, and the network will produce optimized output values for input conditions that were not experienced during training. Once a sufficient number of input condition variations have been processed, the network can then be used for live operation by the stability controller. In some networks, one or more of the stability outputs can be disabled. For example, at an "at anchor" condition, to allow people to safely swim around the vessel, a fin stabilizer system may be disabled. Thus, a network for such a condition can be created using only other available stabilizer systems. Hybrid modes can then be created by averaging coefficients at corresponding nodes. For example, networks 502 and 516 can be combined to maximize stability and minimize noise. It will be appreciated by those skilled in the art that neural networks are one example of a learning structure that can be used for a stability controller as disclosed herein. Other forms of learning structures can be used equivalently.

Figure 6:
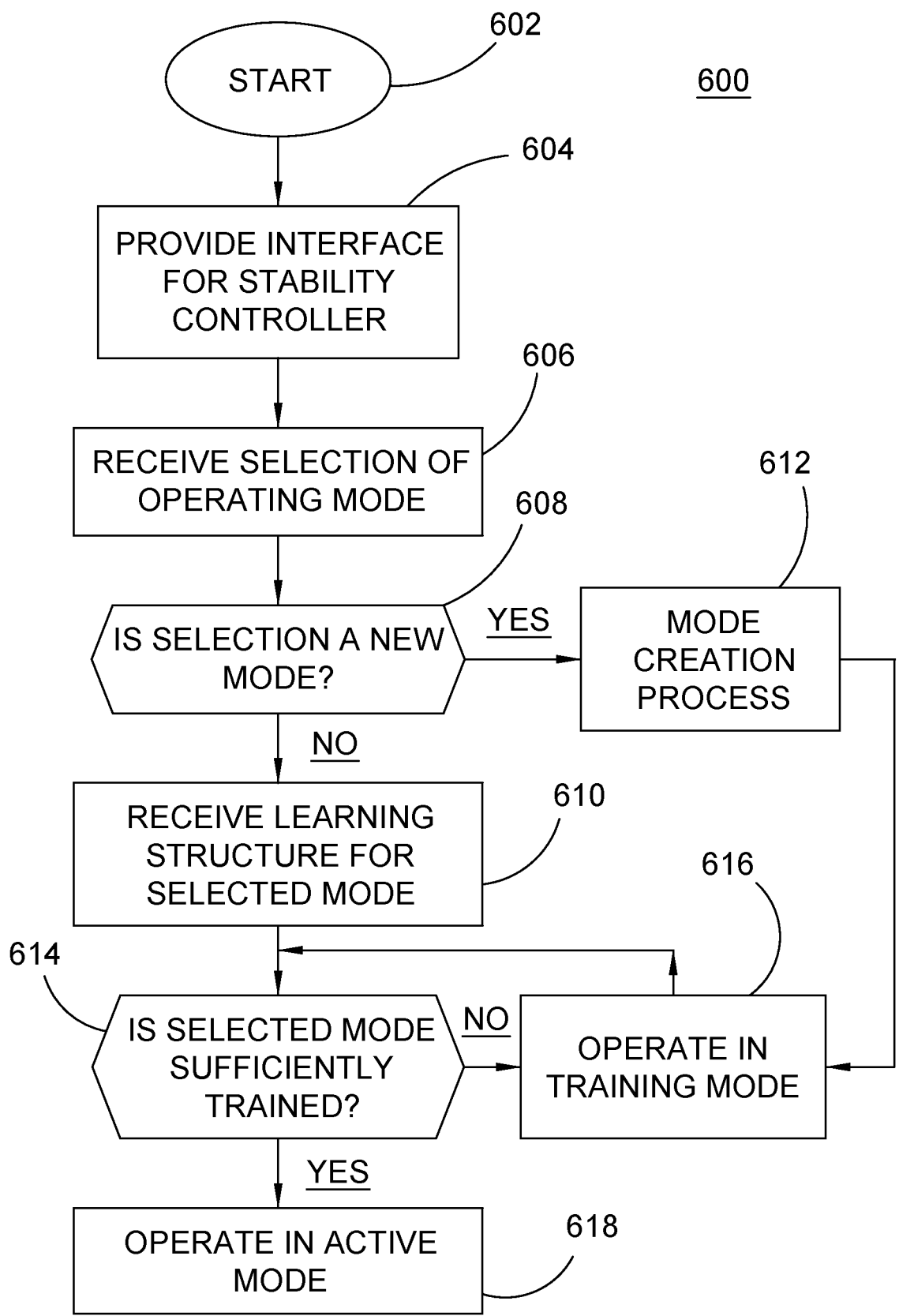
FIG. 6 is a flow chart diagram of a method for operating a stability controller, in accordance with some embodiments.

FIG. 6 is a flow chart diagram of a method 600 for operating a stability controller, in accordance with some embodiments. At the start 620, the stability controller is installed on the vessel and able to receive inputs from the various vessel systems, including the helm, environmental (e.g. wind, wave info), resource usage, and so on. The stability controller has several outputs that are operatively coupled to respective stabilizer systems of the vessel. The stability controller includes a learning engine that is capable of training a learning structure to optimize a selected parameter, such as overall stability, noise level, and resource conservation. In step 604 the stability controller provides an interface (e.g. on a graphic display) that allows a vessel operator to provide input. In particular, the interface can prompt the vessel operator to select a mode of operation reflecting a type of stability desired. The mode of operation indicate a way of operating the stabilizer systems in order to optimize the selected parameter. In step 608 the stability controller determines whether the selection is for a previously defined mode, or a request to create a new mode. If the selection is for a previously defined mode, then in step 610 the stability controller can retrieve the learning structure for that mode from a data store. The learning structure can be a neural network or similar structure that maps input parameters to output stabilizer system settings, using a decision structure that has been weighted through training, to optimize a particular vessel parameter. In step 614 the stability controller determines if the learning structure has been sufficiently trained to be used, and if so, then the method commences to step 618 where the learning structure is used to control the stabilizer systems without user input. Of course, the stability controller can be overridden at any time as a precaution. In step 608, if the selection indicated a new mode that is to be defined, than in step 612 a mode creation process is performed in which the vessel operator indicates which vessel parameter (provided as an input) is to be optimized, and the vessel operator can specific a target value or range, or a threshold to be applied to that vessel parameter. Then in step 616 the stability controller first operated in a training mode where the learning structure is weighted by using the manually selected stabilizer system settings, and modifying the coefficients for nodes or other structure points of the learning structure to achieve a similar output. Likewise, in step 614, if the stability controller find that the selected, and previously defined learning structure is not sufficiently trained, then it proceeds to step 616 for further training.

Figure 8:
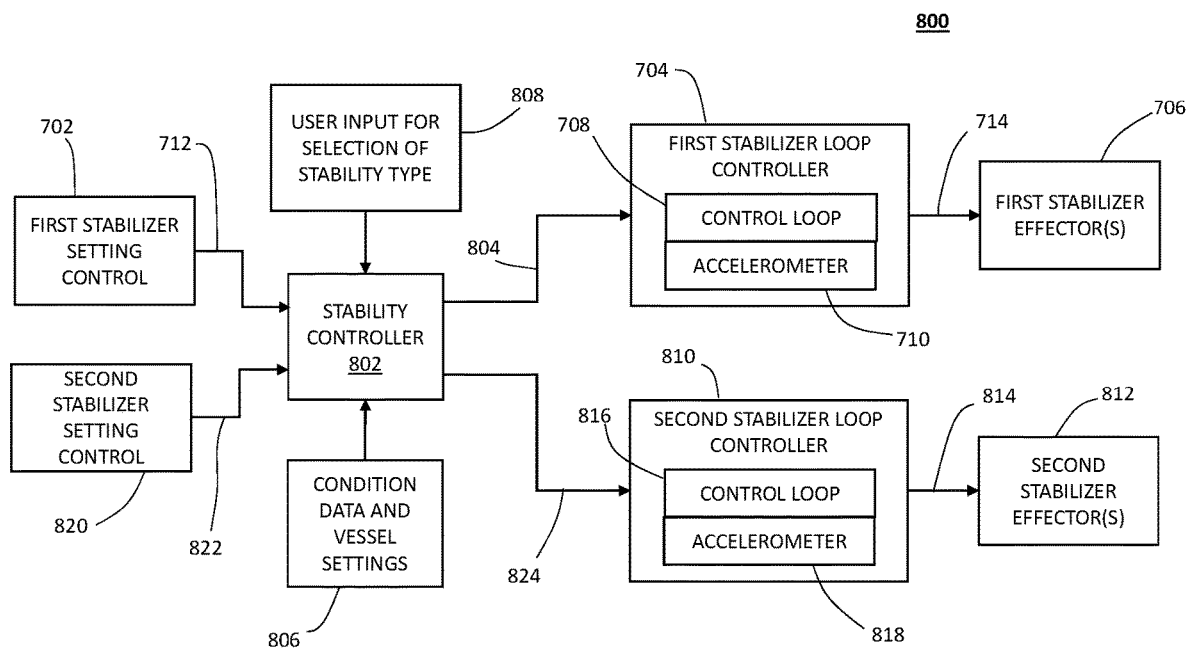
FIG. 8 is a block schematic diagram of a vessel stabilizer system using a stability controller that selects stabilizer control settings based on a stability type selection, environmental data, and vessel settings, in accordance with some embodiments.

FIG. 8 is a block schematic diagram of a vessel stabilizer system 800 using a stability controller 802 that selects stabilizer control settings based on a stability type selection, environmental data, and vessel settings, in accordance with some embodiments. The vessel stabilizer system 800 shown here uses the prior art stabilizer system 700 of FIG. 7 which here is relabeled as the first stabilizer. Thus, the system 800 includes a first a stabilizer setting control 702 which provides a sitting signal 712, the first stabilizer loop controller 704 which provides a stabilizer control signal 714 to the first stabilizer effector 706. The system 800 further includes a second stabilizer setting control 820, a second stabilizer loop controller 810, which controls a second stabilizer effector 812. The second stabilizer loop controller 810 includes a control loop circuit 816 that is operable to generate a stabilizer control signal 814 which controls the operation of the second stabilizer effector 812. Further, the second stabilizer loop controller 810 can also include an accelerometer 818.

Unlike in FIG. 7 where the stabilizer setting control signal 712 is provided directly to the first stabilizer loop controller 704, the stability controller 802 is inserted between the first stabilizer setting control 702 and the first stabilizer loop controller 704 and between the second stabilizer setting control 820 and the second stabilizer loop controller 810. The stability controller 802 can be equivalent to the stability controller 104 of FIG. 1 or the intelligent learning vessel controller 204 FIG. 2. Stability controller receives the first stabilizer control setting signal 712 as well as the second stabilizer setting control signal 822 and generates a first modified stabilizer setting control signal 804 provided to the first stabilizer loop controller 704, and a second modified stabilizer setting control signal 824 that is provided to the second stabilizer loop controller 810. Thus, the stability controller 802 sits between the controls of each stabilizer system and the stabilizer loop controller of that system.

Stability controller 802 does not directly control the stabilizer effectors 706, 812. Rather, The stability controller 802 is operable select and adjust the first modified stabilizer setting control signal 804 and a second stabilizer setting control signal 824 responsive to other inputs in addition to the first and second stabilizer control setting signals 712, 822. Specifically the stability controller 802 is also provided with environmental condition data and vessel settings 806, and a user input 808 indicating a selection of a stability type. The environmental condition data and vessel settings 806 can include, for example, wind speed, vessel heading, vessel speed, resource usage, and location. The user input 808 can indicate a selection of for example resource conservation, ride comfort, minimum noise, and other such settings.

Stability controller 802, is operable in either a learning mode or an operational mode. In the learning mode the stability controller 802 simply passes the first stabilizer setting control signal 712 directly through to the first stabilizer loop controller, and the second stabilizer setting control signal 822 directly to the second stabilizer loop controller 810, and is operable to create, for example, a set of coefficients for a neural network corresponding to the user input 808 as selected by the vessel operator. In an operational mode the stability controller 802 can load user input 808 for a selected stability type. Thus, once the stability controller 802 is properly trained, or sufficiently trained, the first and second stabilizer setting controls 702, 820 do not need to be operated, rather the vessel operator can simply provide an input selection 8084 the type of stability desired, and the stability controller 802, based on condition data and vessel settings 806, will generate the first modified stabilizer setting control signal 804 and the second stabilizer setting control signal 8242 provide the selected type of stability. The vessel operator does not need to adjust the operation of the stabilizer systems, rather as conditions change the stability controller 802 will adjust the first modified stabilizer setting control signal 804 and the second stabilizer setting control signal 824 accordingly to maintain the selected stability type.

The first modified stabilizer control setting signal 804 can be an input to the control loop 708 of the first stabilizer loop controller, and the second modified stabilizer setting control signal 824 can be an input to the control loop circuit 816 of the second stabilizer group controller 810. However, the dynamic control of the first and second stabilizer effectors 706, 812, are provided exclusively by the first stabilizer loop controller 704 and the second stabilizer loop controller 810, respectively. The stability controller 802 having learned how the two (or more) stabilizer systems cooperate can then select optimal settings for each of them independent of each other to achieve the desired stability type. Stability controller 802 does not control stabilizer effectors 706, 812, rather the first stabilizer loop controller 704 and the second stabilizer loop controller 816 continue to operate autonomously using the first modified stabilizer setting control signal 804 and the second stabilizer setting control signal 824, respectively, as inputs.

Figure 9:
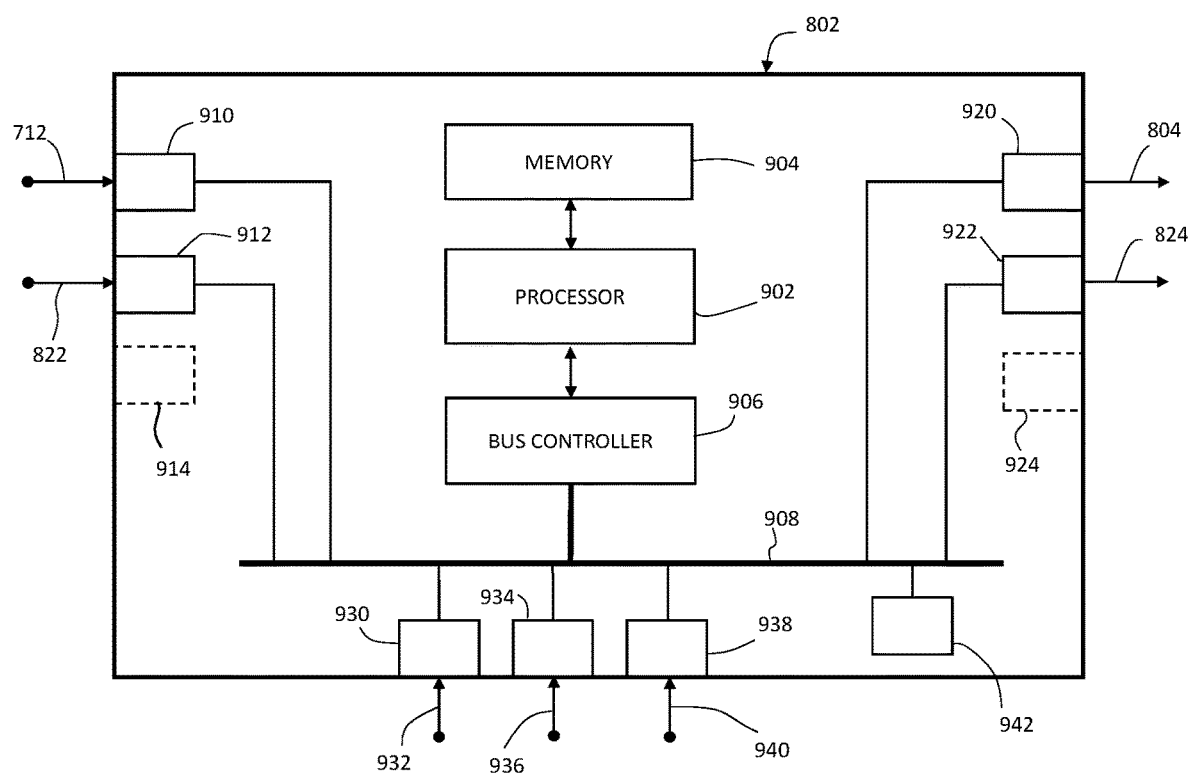
FIG. 9 shows a block schematic diagram of a stability controller, in accordance with some embodiments.

FIG. 9 shows a block schematic diagram of a stability controller 802, in accordance with some embodiments. The stability controller includes a processor 902 that can be a microprocessor, which is interfaced with a memory 904 which can be a random access memory (RANI), as is well known. The memory 904 can include operating system instruction code as well as application program code and data structures used by the operating system code and application program code. The processor 902 can be further interfaced with a bus controller 906 which controls access to a bus 908, such as a peripheral component interface (PCI) bus. Stability controller 802 includes a first stabilizer control signal input interface 910 and a second stabilizer control signal input interface 912. Additional stabilizer control signal input interfaces 914 may additionally be provided. The first and second stabilizer control signal input interfaces 910, 912 are operably coupled to the bus 908. The first stabilizer control signal input interface 910 can receive the first stabilizer control signal 712, and the second control signal input interface 912 can receive the second stabilizer control signal 822. The first stabilizer control signal input interface 910 and the second stabilizer control signal input interface 912 can convert the first and second stabilizer control signals 712, 822 to data that can be used by the processor 902. The stability controller 802 can further include on environmental input interface 930 that is configured to receive one or more environmental data signals 932 which can indicate, for example, wind speed vessel speed location and other environmental parameters. A vessel control setting interface 934 can receive vessel control setting data 936 indicating, for example, throttle settings, rudder settings, resource usage parameters, and other parameters indicating vessel operational control settings. A user input interface 938 can receive a user input 940 indicating a selection of a desired stability type.

The processor 902, responsive to the user input 940 can select, for example, neural network coefficients from a hard drive 942 or similar bulk storage media to be used in determining appropriate outputs (e.g. output control signal values for the stabilizer systems). The hard drive 942 can contain several different sets of coefficients or similar modifiers to be used in generating the output stabilizer control signal values when the stability controller 802 is in on operational mode. The processor 902 responsive to the user input 940 and the other input signals 712, 822, 932, 936 determines appropriate values to be output to the stabilizer loop controllers (e.g. 704, 810). Thus first stabilizer control signal output interface 920 can provide the first modified stabilizer control signal 804 and a second stabilizer control output interface 922 can provide the second modified stabilizer control signal 824. The first and second stabilizer control output interfaces 920, 922 can receive digital values from the processor 902 and output digital or analog signals as required by the respective stabilizer loop controllers. In some embodiments interfaces 910 and 920 can be on one daughter card that interfaces with the bus 908. Likewise, can be on the same card interfaced with bus 908. Additional output interfaces 924 may also be provided in some embodiments.

When operated in a learning mode the stability controller 802 operates interfaces 910, 920 such that the first stabilizer control signal 712 and the output signal 804 of interface 920 are the same. This can be done by simply duplicating the signal value by the processor 902, or the processor 902 can control the card on which interfaces 910, 920 are located to simply route the input signal 712 to the output of interface 920. The same is done with interfaces 912, 922 in the learning mode. In the learning mode the stability controller 802 observes the various inputs and develops, for example a set of learned coefficients to map a selected stability type with the stabilizer control input signals 712, 822 and the various other inputs (e.g. 932, 936). Once the stability controller 802 is sufficiently trained it can then be used in operating mode where the user input 940 indicates a stability type selection and the stabilizer control input signals 712, 822 may then be ignored as the processor according to the application program code using the coefficients corresponding to the selected stability type will then generate appropriate values for the stabilizer control output signals 804, 824.

A stability controller has been disclosed that uses a machine learning engine to select optimized settings for a plurality of stabilizer systems on a vessel. The output optimized stabilizer system settings can, in some cases, control operation of the various stabilizer systems at an on/off level, or in some cases the optimized stabilizer setting can be used by a respective stabilizer system to attenuate or augment the control loop feedback of the stabilizer system. This provides the benefit of allowing a vessel operator to select what constraint is important at any given time, thus, a vessel operator can select to optimize resource conservation, passenger comfort, and so on. The stability controller can work with any stabilizer system as it does not need to provide control signals to the stability effectors (e.g. the fins, counterweight position, gyroscope spin rate), rather it applies settings to these systems, which already have their one internal feedback controls, thereby utilizing the stabilizer systems' resources rather than duplicating the control components and circuitry.

What is claimed is:

1. A vessel stability controller for controlling a plurality of stabilizer systems of a vessel, comprising:
 a processor;
 at least one vessel control input connector operably coupled to the processor and configured to receive a control state signal for a corresponding vessel system from a first vessel controller;
 a first stabilizer input connector operably coupled to the processor and configured to receive a first operator-selected stabilizer setting signal for a first stabilizer system of the vessel;
 a second stability input connector operably coupled to the processor and configured to receive a second operator-selected stabilizer setting signal for a second stabilizer system of the vessel;
 a first resource input connector operably coupled to the processor and configured to connect to a first vessel resource system and receive a first resource usage signal indicating a resource usage of the first vessel resource system by the first stabilizer system;
 a second resource input connector operably coupled to the processor and configured to connect to a second vessel resource system and receive a second resource usage signal indicating a resource usage by the second stabilizer system;
 a first output connector operably coupled to the processor and configured to provide a first stabilizer setting signal to the first stabilizer system of the vessel, wherein the first stabilizer setting signal sets an operating state of the first stabilizer system when applied to the first stabilizer system;
 a second output connector operably coupled to the processor and configured to provide a second stabilizer setting signal to the second stabilizer system of the vessel, wherein the second stabilizer setting signal sets an operating state of the second stabilizer system; and
 wherein the processor is configured to:
  receive a stability mode selection;
  select one learning structure from a plurality of learning structures, wherein the one learning structure is selected based on the stability mode selection, wherein the plurality of learning structures are stored in a database that is coupled to the vessel stability controller; and
  apply the control state signal, first resource usage signal, and second resource usage signal to the selected one of the plurality of learning structures and thereby generate the first and second stabilizer setting signals and thereby control an operating state of each of the first and second stabilizer systems in accordance with the selected one of the plurality of learning structures.

2. The vessel stability controller of claim 1, further comprising:
 a wind input connector configured to receive a wind direction signal and a wind speed signal; and
 wherein the processor is further configured to generate the first and second stabilizer setting signals upon being trained based on the wind direction signal and the wind speed signal.

3. The vessel stability controller of claim 1, wherein the processor is further configured to generate the first and second stabilizer setting signals upon being trained based on a user-provided constraint that limits one of the plurality of stabilizer systems to a specified operating state.

4. The vessel stability controller of claim 1, further comprising: an optimization input connector configured to receive an operator selection signal that indicates an operating preference; and
 wherein the processor is further configured to generate the first and second stabilizer setting signals upon being trained based on the operator selection signal.

5. The vessel stability controller of claim 1, wherein the first stabilizer setting signal is a setting signal for a gyroscopic stabilizer system.

6. The vessel stability controller of claim 1, wherein the second stabilizer setting signal is a setting signal for a fin stabilizer system.

7. The vessel stability controller of claim 1, further comprising:
- a third stability input connector configured to receive a third operator-selected stabilizer setting signal for a third stabilizer system of the vessel;
- a third resource input connector configured to receive a third resource usage signal indicating a resource usage by the third stabilizer system;
- a third output connector configured to provide a third stabilizer setting signal to the third stabilizer system of the vessel, wherein the third stabilizer setting signal sets an operating state of the third stabilizer system when applied to the third stabilizer system; and
- wherein the processor is configured to generate the third stabilizer setting signal upon being trained based further on the third operator-selected stabilizer setting signal and the third resource usage signal.

8. The vessel stability controller of claim 7, wherein the third stabilizer setting signal is a setting signal for a shifting counterweight stabilizer system.

9. A vessel stability controller, comprising:
- a processor;
- a first stability control output connector configured to provide a first stabilizer setting signal to a first vessel stabilizer system, wherein the first stabilizer setting signal sets an operating state of the first vessel stabilizer system when applied to the first vessel stabilizer system;
- a second stability control output connector configured to provide a second stabilizer setting signal to a second vessel stabilizer system, wherein the second stabilizer setting signal sets an operating state of the second vessel stabilizer system when applied to the second vessel stabilizer system; and
- wherein the processor that is configured to select one learning structure from a plurality of learning structures in a database coupled to the vessel stability controller, wherein the selection of the one learning structure is responsive to a stability mode selection, generate the first stabilizer setting signal and the second stabilizer setting signal as outputs of the selected one of the plurality of leaning structures, and provide the first stabilizer setting signal to the first vessel stabilizer system through the first stability control output connector and provide the second stabilizer setting signal to the second vessel stabilizer system through the second stability control output connector and thereby control an operating state of each of the first and second vessel stabilizer systems.

10. The vessel stability controller of claim 9, wherein the selected one of the plurality of learning structures is configured to optimize a particular vessel parameter, wherein each of the plurality of learning structures are configured to optimize a different vessel parameter.

11. The vessel stability controller of claim 9, wherein the first stabilizer setting signal sets an operating state of a gyroscopic stabilizer system when applied to the gyroscopic stabilizer system, and the second stabilizer setting signal sets an operating state of a fin stabilizer system when applied to the fin stabilizer system.

12. A method for setting operating states of stabilizer systems of a vessel by a stability controller on the vessel, wherein the stability controller is operably coupled to at least two vessel stabilizer systems of the vessel and is configured to control stabilizer settings of each one of the at least two vessel stabilizer systems, wherein the stabilizer settings set an operating state of each of the at least two vessel stabilizer systems, the method comprising:
- receiving, at the stability controller, a selection of a vessel parameter to be optimized;
- the stability controller identifying a learning structure corresponding to the vessel parameter from a plurality of learning structures stored in a database coupled to the stability controller;
- loading the learning structure into the stability controller;
- the stability controller receiving a plurality of input setting signals and processing the plurality of input setting signals through the learning structure and generating at least a first stabilizer setting for a first stabilizer system of the vessel and a second stabilizer setting for a second stabilizer system of the vessel;
- the stability controller applying the first stabilizer setting to the first stabilizer system and applying the second stabilizer setting to the second stabilizer system;
- responsive to applying the first stabilizer setting to the first stabilizer system, the first stabilizer system operating at an operating state corresponding to the first stabilizer setting; and
- responsive to applying the second stabilizer setting the second stabilizer system, the second stabilizer system operating at an operating state corresponding to the second stabilizer setting.

* * * * *